J. J. HUTCHISON & J. D. BRANDBURY.
Brick Molder.
No. 30,406. Patented Oct. 16, 1860.
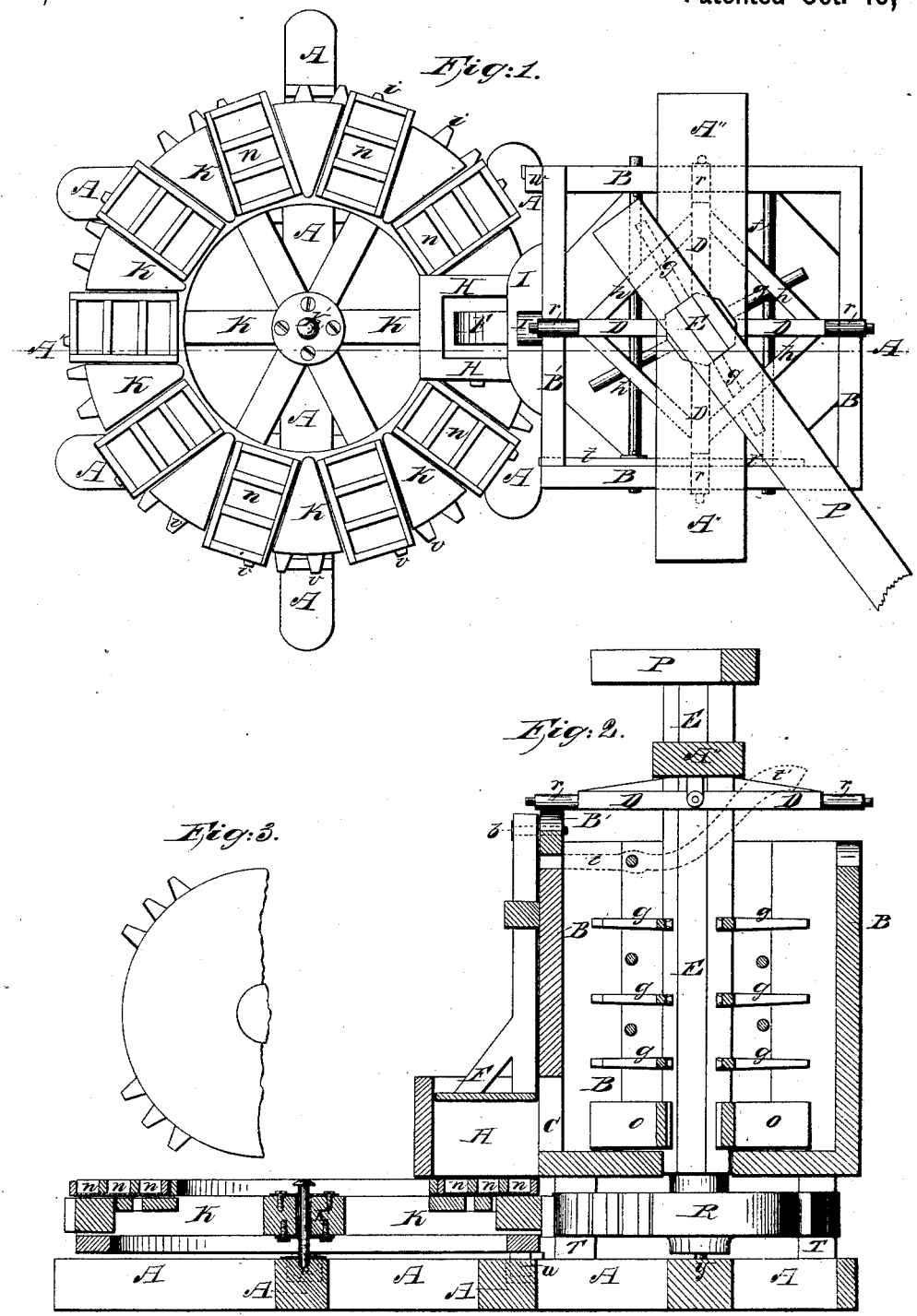

UNITED STATES PATENT OFFICE.

J. J. HUTCHISON AND J. D. BRANDBERY, OF CAPE GIRARDEAU, MISSOURI.

BRICK-MOLDING MACHINE.

Specification of Letters Patent No. 30,406, dated October 16, 1860.

*To all whom it may concern:*

Be it known that we, J. J. HUTCHISON and J. D. BRANDBERY, of Cape Girardeau, in the county of Cape Girardeau and State of Missouri, have invented a new and Improved Brick-Mold; and we do hereby declare that the following is a full, clear, and exact description of the same, reference being had to the annexed drawing, making part of this specification, in which—

Figure 1 is a top view, of our improved brick mold and Fig. 2 is a vertical section thereof taken on the line A′ A′ of Fig. 1.

To enable any one skilled in the art to which our invention appertains to make and use the same, we will proceed to describe the construction and operation thereof.

Similar letters of reference represent corresponding parts of the different figures of the drawing annexed.

The frame of our machine is shown upon the drawing by A. It is composed of wood, and is rectangular in form, and of considerable length and breadth so as to insure a firm bearing upon the ground. Over one end of the said frame, we arrange the box B, upon short columns T T, and secure it by means of a vertical frame which rises up alongside of the box aforesaid and spans across the top thereof as shown in the drawing by A″ A″. In the center of the box, aforesaid, we erect a shaft, shown in the drawing by E. The lower end of this shaft we make in the form of a pivot journal, and pass it down through the bottom of the box B and seat it in a journal box, fixed in the frame by Y; the upper end of the said shaft being supported in the cross piece A″ A″ which spans the upper end of the box.

On the lower end of the shaft E we fix a wheel shown in the drawing by R, and upon the periphery of this wheel we make four series of three teeth or cogs, equidistant from each other. A plan of this wheel is shown by Fig. 3. Upon the front end of the main frame we arrange another and a larger wheel, shown in the drawing by K. The said wheel is arranged horizontally and made to rotate about the pin K′, as the axis thereof, and upon the periphery of this wheel there are ten series of three cogs interspaced, equidistant from each other, as shown by $v$, $v$, and upon the upper disk of the said wheel K there are ten series of molds disposed near the periphery and at an equal distance from one another, as shown in the drawing by $n$, $n$, $n$, $n$. Each series of these molds are made in separate blocks and set in cavities made in the disk of the wheel, so that they may be drawn out and replaced at pleasure. These two wheels—that is to say the wheels R and K—are arranged so as to gear into each other as will be more fully described hereinafter.

In the upper end of the shaft E just above the top of the box B we fix four arms, shown in the drawing by D, and between these arms we introduce the braces $h$, $h$, to strengthen and support them. The ends of these arms are made to act upon a cam lever B′, one end of which is hinged to the box at $w$. This cam lever is made to rise and fall by the action of the end $r$ of the arms D upon it. It is pressed down by the direct action of the arms upon a sloping rise made in the center thereof, in the nature of a cam, and it is raised by the action of the arms upon the upper end $t'$ of the lever $t$ which is fulcrumed on the rod $c$, the lower end of this last mentioned lever being made to act against the under side of the loose end of the lever B′.

The box B is the mud hopper wherein the material is mixed and to the front of the said box or hopper, the press box is fixed, into which the plunger F is made to work, the said plunger being operated by the lever B′ to which it is attached about in the center, by means of a pin, shown by $b$, Fig. 2. The hopper B communicates through the opening G with the press box H, in which the plunger is made to operate.

Upon the upper end of the shaft E a long lever is fixed, and through the body of the said shaft a number of pins $g$ $g$ $g$ are driven, which serve to mix the material in the hopper, and near the bottom of the said hopper and in the shaft aforesaid quite a wide piece of board or plank is mortised, which serves as a wiper to shove the prepared material, out of the hopper into the press box.

In the main frame at $u$ and under the disk of the mold wheel K near the periphery small rollers are inserted, for the disk of the wheel to ride upon. Thus much for the construction of our molds.

The operation is as follows: The hopper being first supplied with material, the machine is put in motion by the application of power to the lever P whereby the material, is mixed by the operation of the pins $g$ $g$ $g$ into it, and thereupon it is shoved into the press box by the action of the wiper o, from whence it is pressed into the molds n, n, n, by the action of the plunger F which is actuated by the arms D, D, D, D,—that is to say it is pressed forward, or down by the action of these arms upon the cam lever B', and it is thrown up by the action of the said arms upon the lever t. This machine is intended to mold twelve bricks every time the shaft E makes a revolution, the relation of the cogs and spaces on the wheels K and R being so arranged as to cause the wheel K to move forward as soon as the arms D have pressed the plunger F down so as to fill the molds and they are also so arranged as to cause the wheel K, to move far enough forward to bring a succeeding mold under the plunger, every time it moves.

Now we are aware that brick molding machines have been made that employ some of the devices contained in our machine, but we do not claim any of the devices separately, as none of them considered by themselves are new.

What we claim therefore and desire to secure by Letters Patent is—

The combination of the wheels K and R, the clay box B, the press box H, and the plunger F, when these several parts are constructed, arranged, and operated, substantially in the manner described.

J. J. HUTCHISON.
J. D. BRANDBERY.

Witnesses:
J. W. G. LANGLOIS,
G. H. CRAMER.